(12) United States Patent
Fujii et al.

(10) Patent No.: US 8,613,532 B2
(45) Date of Patent: Dec. 24, 2013

(54) LIGHT FLUX CONTROLLING MEMBER, LIGHT EMITTING DEVICE, AND LIGHTING DEVICE

(75) Inventors: Yuki Fujii, Saitama (JP); Mamoru Yoshida, Saitama (JP); Kazuma Yanagisawa, Saitama (JP); Tomohiro Saito, Saitama (JP)

(73) Assignee: Enplas Corporation, Saitama (JP)

( * ) Notice: Subject to any disclaimer, the term of this patent is extended or adjusted under 35 U.S.C. 154(b) by 261 days.

(21) Appl. No.: 13/081,037

(22) Filed: Apr. 6, 2011

(65) Prior Publication Data

US 2011/0249451 A1    Oct. 13, 2011

(30) Foreign Application Priority Data

Apr. 7, 2010    (JP) .................................. 2010-088948

(51) Int. Cl.
*F21V 5/00*    (2006.01)

(52) U.S. Cl.
USPC ...................... 362/311.02; 362/555

(58) Field of Classification Search
USPC ............................................ 362/555, 311.02
See application file for complete search history.

(56) References Cited

U.S. PATENT DOCUMENTS

| | | | |
|---|---|---|---|
| 7,800,125 B2 * | 9/2010 | Chen | 257/98 |
| 8,115,384 B2 * | 2/2012 | Destain et al. | 313/512 |
| 8,174,032 B2 * | 5/2012 | Aliyev et al. | 257/88 |
| 8,339,716 B2 * | 12/2012 | Premysler | 359/728 |

FOREIGN PATENT DOCUMENTS

| | | |
|---|---|---|
| EP | 1641052 | 3/2006 |
| EP | 1653254 | 5/2006 |
| EP | 1860467 | 11/2007 |
| EP | 2023038 | 2/2009 |
| JP | 2007-148332 A | 6/2007 |
| JP | 2009-152142 A | 7/2009 |

OTHER PUBLICATIONS

Extended European Search Report dated Jul. 29, 2011.

* cited by examiner

*Primary Examiner* — Peggy A. Neils
(74) *Attorney, Agent, or Firm* — Washida & Associates

(57) ABSTRACT

In the light flux controlling member (5), the angle between an optical path of light output from the light emission center (14) of a light emitting element (4) and optical axis L1 is θ2. Light is incident on the light flux controlling member (5) through an input surface and travels inside the light flux controlling member at an angle θ2 with respect to optical axis L1. Then, light is output from a light control output surface (10) at an angle θ3 with respect to optical axis L1. The input surface (15) and the light control output surface (10) are formed such that, in a range 0<θ1≤θ1max, the relationship between θ1 and θ2 is reversed from θ1<θ2 to θ1>θ2 when θ1 increases, and the relationship between θ1 and θ3 is reversed from θ1<θ3 to θ1>θ3 when θ1 increases.

4 Claims, 15 Drawing Sheets

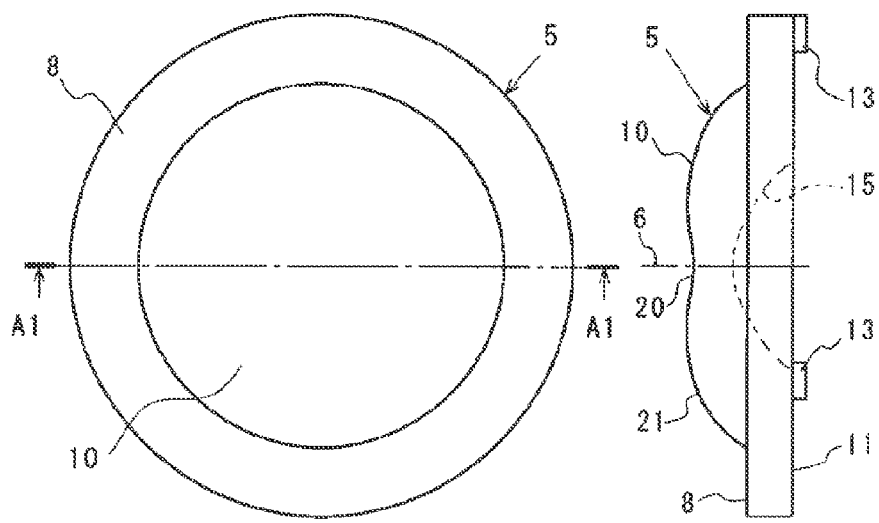
FIG.4A
FIG.4D
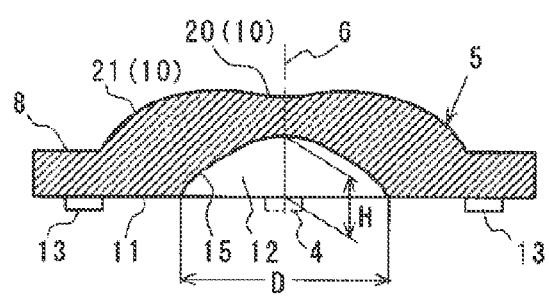
FIG.4B
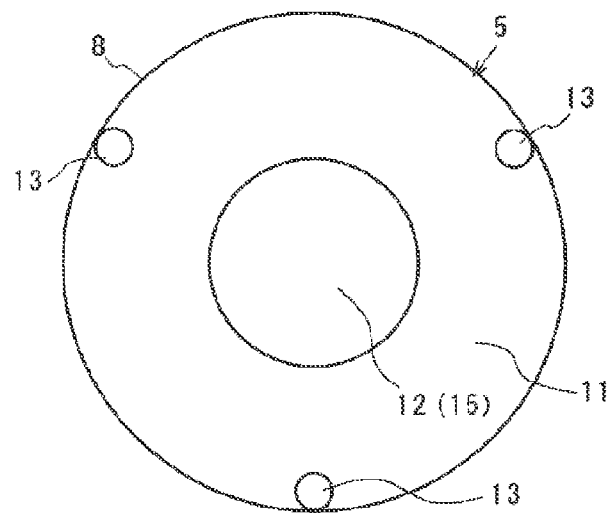
FIG.4C

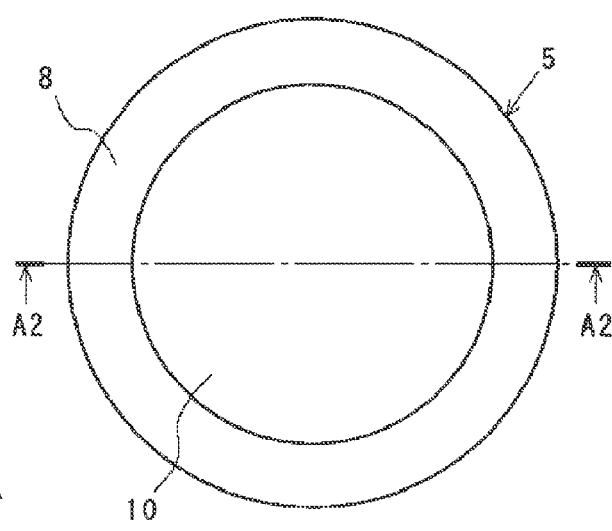
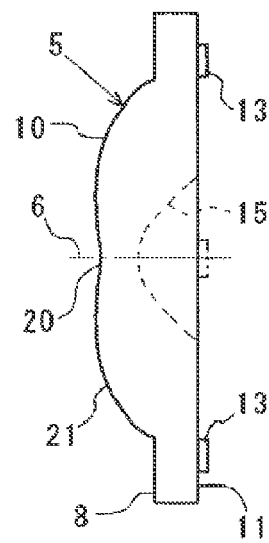
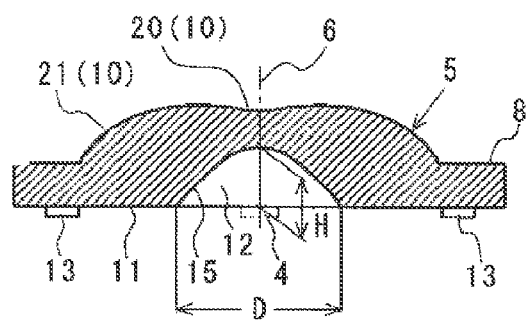
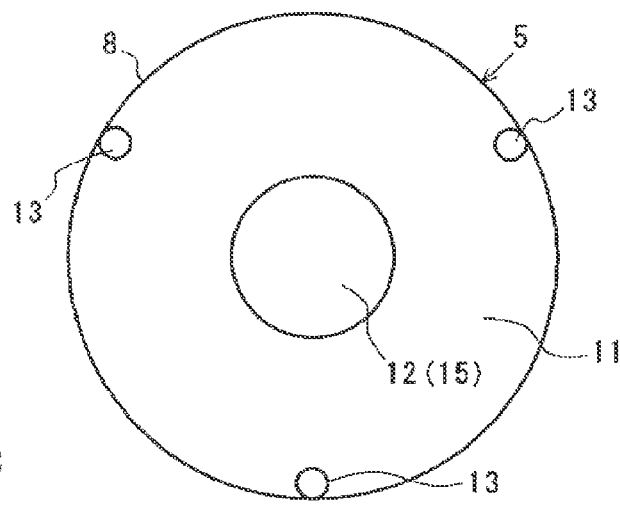
FIG.12A
FIG.12B
FIG.12C
FIG.12D

LIGHT FLUX CONTROLLING MEMBER, LIGHT EMITTING DEVICE, AND LIGHTING DEVICE

CROSS REFERENCE TO RELATED APPLICATIONS

The disclosure of Japanese Patent Application No. 2010-088948, filed on Apr. 7, 2010, including the specification, drawings and abstract, is incorporated herein by reference in its entirety.

TECHNICAL FIELD

The present invention relates to a light emitting device that outputs light from a light emitting element (LED, for example) via a light flux controlling member, a light device that illuminates an illumination-target member (advertisement panel, liquid crystal display panel, etc.) from the rear using that light emitting device, and a light flux controlling member to constitute these lighting device and light emitting device.

BACKGROUND ART

Prior Art 1

FIG. 1 shows lighting device 100 according to prior art 1. Lighting device 100 places light emitting device 101 on the rear side of an illumination-target member (not shown) such as an advertisement panel, and illuminates the illumination-target member from the rear by the light output from that light emitting device 101. Light emitting device 101 outputs the light from light emitting element 102 (LED, for example) via light flux controlling member 103. Light flux controlling member 103 of light emitting device 101 is formed such that, in the light output from light emitting element 102, light near optical axis La is refracted and incident to spread in a direction to part from optical axis La, and this incident light is refracted and incident to spread in a direction to part farther from optical axis La. Also, light flux controlling member 103 is formed such that, in the light output from light emitting element 102, light Q that is near the limit of use as illuminating light is refracted and that is refracted and incident to spread in a direction to part from optical axis La, and this incident light Q is refracted and output to be concentrated in a direction to approach optical axis La closer (see, for example, patent literature 1). Here, "optical axis La" refers to the traveling direction of light in the center of output light fluxes from light emitting element 102, seen from a three dimensional perspective.

Prior Art 2

FIG. 2 shows lighting device 110 according to prior art 2. Like prior art 1, lighting device 100 places light emitting device 111 on the rear side of an illumination-target member (not shown) such as an advertisement panel, and illuminates the illumination-target member from the rear by the light output from that light emitting device 111. Like prior art 1, light emitting device 111 is formed to output light from light emitting element 112 (LED, for example) via light flux controlling member 113. Light flux controlling member 113 is then formed such that the light output from light emitting element 112 is incident without refraction and this incident light is refracted and output to spread in a direction to part from optical axis La (see, for example, patent literature 2).

Patent Literature 1: Japanese Patent Application Laid-Open No. 2007-148332
Patent Literature 2: Japanese Patent Application Laid-Open No. 2009-152142

SUMMARY OF INVENTION

Technical Problem

Generally speaking, with a light flux controlling member of a lighting device, it is necessary to avoid directly handling a light control output surface (which is a lens surface to control and output the light from a light emitting element) by an automated device and the like upon manufacturing or at the time of assembly and damaging the light control output surface as a result of this.

Consequently, there are cases where a flange is formed outside the light control output area of a light flux controlling member as a non-optical part.

Light flux controlling member 113 according to prior art 2 receives light output from light emitting element 112 without refraction, so that a flange can be formed more easily than light flux controlling member 103 of prior art 1. However, with light flux controlling member 113 of prior art 2, light that is guided by a flange and therefore cannot be used as illuminating light is included in the light output from light emitting element 112, and so the efficiency of use of light is low.

It is therefore an object of the present invention to provide: a light flux controlling member that does not adversely influence the quality of lighting on an illumination-target surface by damaging the illumination-target surface by handling upon manufacturing or at the time of assembly, that can improve the efficiency of use of light, and that can prevent a bright area from being formed on a location-specific basis right above a light emitting element; a light emitting device having this light flux controlling member; and a lighting device having this light emitting device.

Solution to Problem

A light flux controlling member according to the present invention is placed such that a reference optical axis, which is the traveling direction of light in the center of a three dimensional output light flux, and an optical axis, which is the traveling direction of light in the center of a three dimensional output light flux of a light emitting element, are located on the same axis, and controls the traveling direction of the light flux output from the light emitting element, and this light flux controlling member adopts a configuration including: an input surface that is formed in a non-spherical surface of rotational symmetry with respect to the optical axis, by forming a recess in a surface opposing the light emitting element, and receives as input the light from the light emitting element; and a light control output surface that is formed on an opposite side from a back surface and outputs the light received as input in the input surface, and, with this light flux controlling member, when the angle formed between an optical path and the optical axis is $\theta_2$, the optical path being the path on which light that is output from a light emission center of the light emitting element at angle $\theta_1$ with respect to the optical axis and is incident on the input surface travels inside the light flux controlling member, and angle $\theta_1$ of light to arrive at the outermost edge of the light control output surface in the light output from the light emitting element is $\theta_{1max}$; and the input surface and the light control output surface are formed such that, in a range where $0<\theta_1\leq\theta_{1max}$, a relationship in size between θ1 and θ2 is reversed gradually changes from θ1<θ2 to θ1>θ2, following an increase of θ1.

A light emitting device according to the present invention adopts a configuration including a light emitting element and the above light flux controlling member.

A lighting device according to the present invention adopts a configuration having the above light emitting device and an illumination-target member that is illuminated by the light output from the light emitting device.

With the light flux controlling member of the present invention, by forming a flange, damage to be caused by handling upon manufacturing or at the time of assembly does not adversely influence the quality of lighting on an illumination-target surface. Also, with the light flux controlling member of the present invention, even if a flange is formed, incident light of a wide angle can be guided to a light control output surface, so that it is possible to use the light from a light emitting device as illuminating light efficiently. Furthermore, with the light flux controlling member of the present invention, the dead space where light that is incident on an input surface of a light flux controlling member does not pass can be widened, so that it is possible to improve the flexibility of design with respect to the locations to form a flange and support legs (which doe not influence or contribute to light flux control) in the light flux controlling member.

Also, with the light flux controlling member of the present invention, in the light output from a light emitting element, light near the optical axis can be widened, so that, by placing an illumination-target surface on a light flux controlling member as a lighting device, it is possible to prevent a bright part from forming right above the light emitting element on a location-specific basis, and improve the quality of lighting upon the illumination-target surface.

BRIEF DESCRIPTION OF DRAWINGS

FIG. 4 shows a first embodiment of a light flux controlling member to constitute the light emitting device of FIG. 3;

FIG. 12 shows a light flux controlling member according to the second embodiment;

DESCRIPTION OF EMBODIMENTS

Now, embodiments of the present invention will be described in detail.

(Light Emitting Device and Lighting Device)

Figure 1:
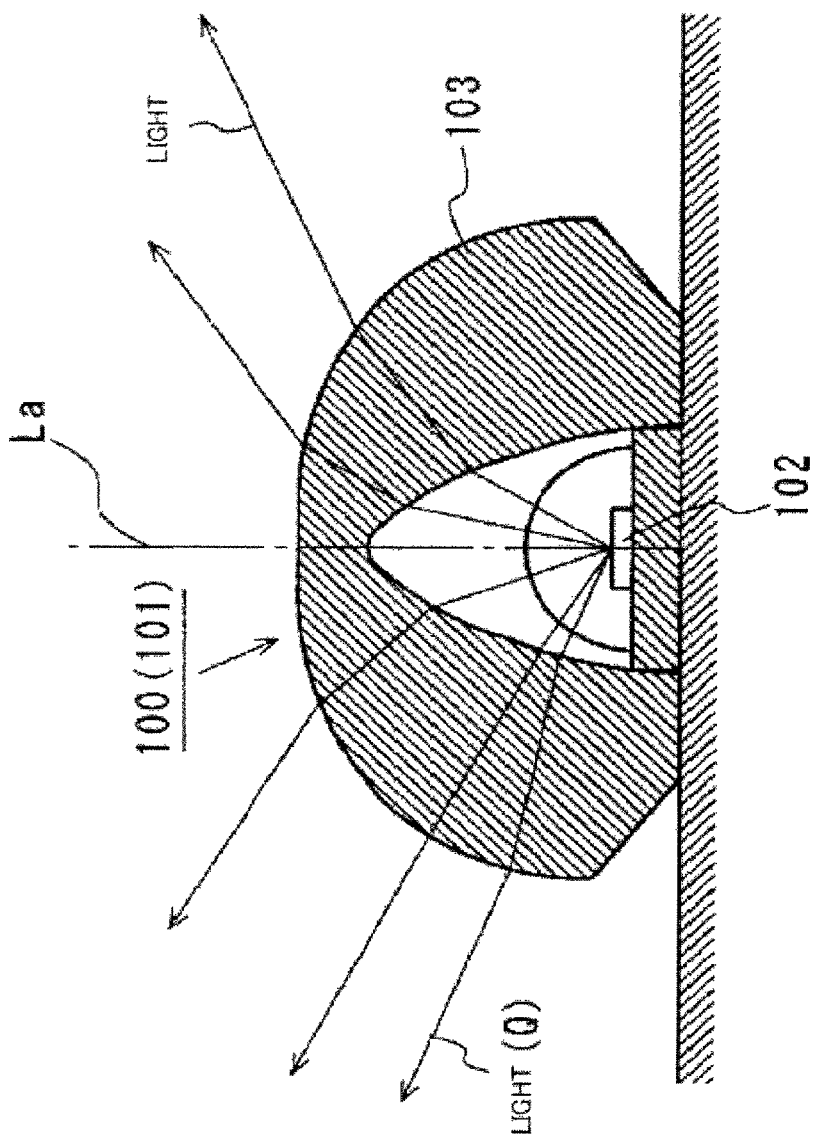
FIG. 1 is a cross sectional view showing a light emitting device according to prior art 1.
Figure 2:
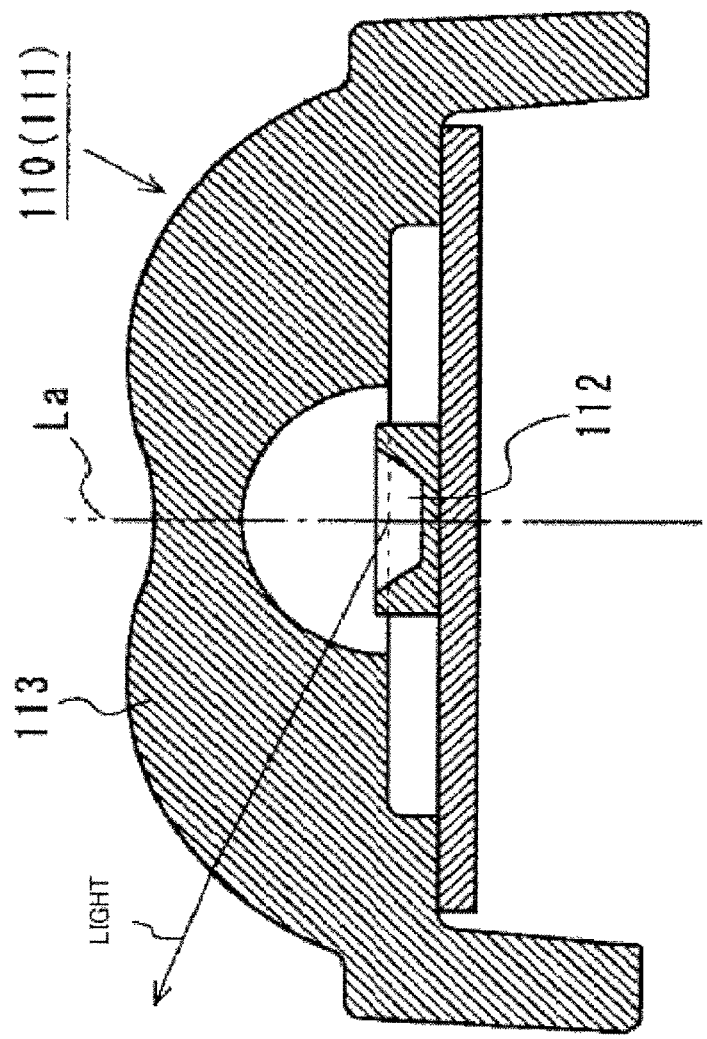
FIG. 2 is a cross sectional view showing a light emitting device according to prior art 2.
Figure 3:
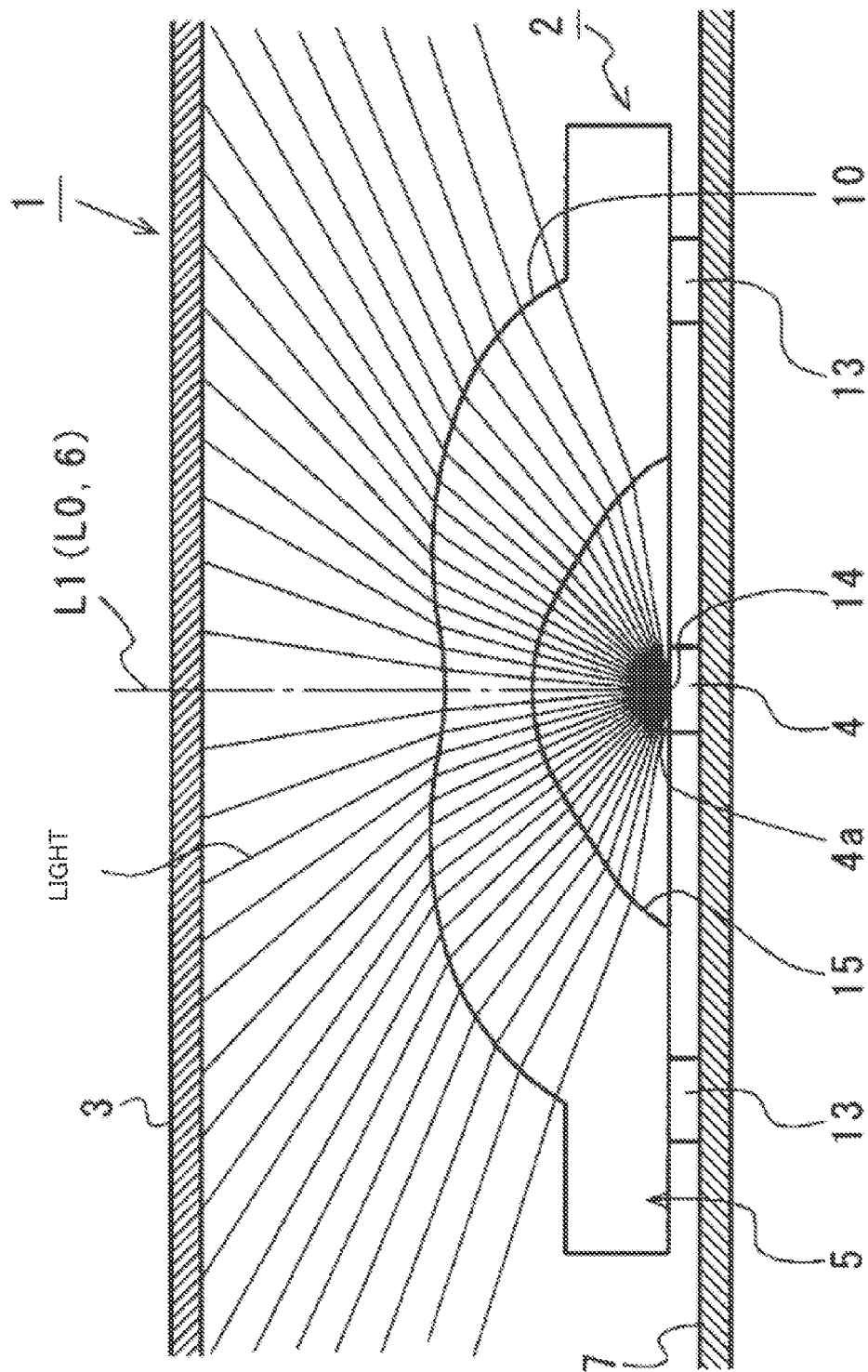
FIG. 3 is a cross sectional view showing a light emitting device according to the present embodiment and a lighting device using this light emitting device.

FIG. 3 shows lighting device 1 according to the present embodiment and light emitting device 2 constituting this lighting device 1, and is a partial cross sectional view of lighting device 1, including reference optical axis L0 of light emitting device 2. As shown in this FIG. 3, lighting device 1 places light emitting device 2 on the rear side of translucent illumination-target member 3 (for example, an advertisement panel, a liquid crystal panel, etc.), and illuminates illumination-target member 3 from the rear by the light output from that light emitting device 2. Light emitting device 2 outputs the light from light emitting element 4 (for example, an LED, an LED sealed by a sealing member and so on), via light flux controlling member 5. Light flux controlling member 5 corresponds one-to-one with light emitting element 4. Here, "optical axis L0" refers to the traveling direction of light in the center of output light fluxes from light emitting element 2, seen from a three dimensional perspective. Also, a case will be described with the present embodiment, by way of example, where optical axis L1 of light emitting element 4 (the traveling direction of light in the center of a three-dimensional output light flux from light emitting element 4) and reference optical axis L0 match. In the following descriptions, reference optical axis L0 will be rephrased as "optical axis L1."

(First Embodiment of Light Flux Controlling Member)

Figure 5:
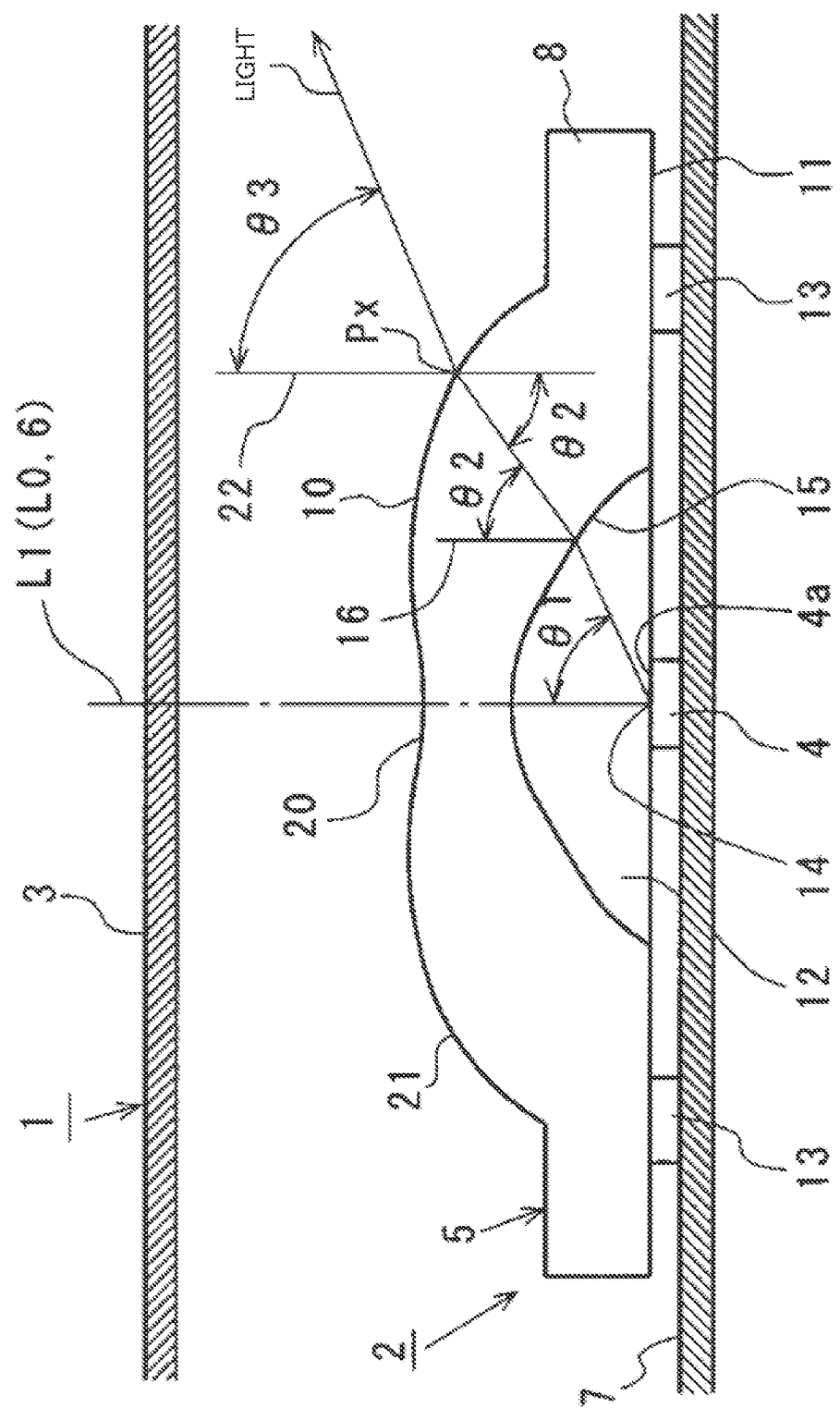
FIG. 5 shows a state of use of a light flux controlling member according to the first embodiment.

FIG. 4 and FIG. 5 show the first embodiment of light flux controlling member 5. Also, FIG. 4(a) is a plan view of light flux controlling member 5, FIG. 4(b) is a cross sectional view of light flux controlling member 5 cut along line A1-A1 in FIG. 4(a), FIG. 4(c) is a rear view of light flux controlling member 5, and FIG. 4(d) is a side view of light flux controlling member 5. Also, FIG. 5 illustrates a state of use of light flux controlling member 5.

Light flux controlling member 5 is formed of a transparent resin material such as PMMA (polymethylmethacrylate), PC (polycarbonate) or EP (epoxy resin), transparent glass, and so on.

Light flux controlling member 5 is formed such that the shape of its flat surface is a circular shape. Light flux controlling member 5 is placed on substrate 7 such that its center axis 6 matches the centroid of the flat surface shape, is superimposed on the optical axis of light flux controlling member 5, and matches optical axis L1 of light emitting element 4. Consequently, in the following description, center axis 6 of light flux controlling member 5 will be rephrased as "optical axis L1" wherever appropriate. Annular flange 8, which is a circular-symmetrical shape around center axis 6, is formed in light flux controlling member 5. Also, on the inner side along the diameter direction of flange 8 of light flux controlling member 5, and above flange 8, light control output surface 10 having a circular symmetrical shape around center axis 6 is formed. Furthermore, recess 12 is formed on the back surface 11 side of light flux controlling member 5 opposing light emitting element 4. Also, on back surface 11 of flange 8 of light flux controlling member 5, a plurality of tubular bar-shaped support legs 13 are provided at equal intervals. Support legs 13 of light flux controlling member 5 are fixed, using an adhesive and so on, on substrate 7 where light emitting element 4 is placed. By this means, light flux controlling member 5 is supported on substrate 7 such that light emission center 14 of light emitting element 4 and the height location of back surface 11 of light flux controlling member 5 (that is, the height location in the normal direction of substrate 7) are approximately the same (see FIG. 5).

The inner surface of recess 12 of light flux controlling member 5 is input surface 15 that allows the light from light emitting element 4 to enter light flux controlling member 5. Input surface 15 is formed in a shape of a circular-symmetrical, non-spherical surface around center axis 6, so that, in the light output from light emitting element 4, light near optical axis L1 is refracted and is incident in a direction to part from optical axis L1. Here, as shown in FIG. 5, the angle (incidence angle) formed between light that is output from light emission center 14 and that arrives at input surface 15, and optical axis L1, is θ1, and the angle between the light that is incident through input surface 15 into light flux controlling member 5 and line 16 that is parallel to optical axis L1, is θ2. To hold θ1<θ2, input surface 15 refracts light near optical axis L1 in the light output from light emitting element 4 (see FIG. 3). Also, as shown in FIG. 5, the location on light control output surface 10 where light entering inside light flux controlling member 5 through input surface 15 arrives at is Px, and the angle formed between the traveling direction of light output from Px on light control output surface 10 and line 22 that is parallel to optical axis L1, is θ3.

Input surface 15 of light flux controlling member 5 is formed such that the light output from light emitting element 4, except for light near optical axis L1, is refracted and incident in a direction to approach optical axis L1 closer. That is to say, input surface 15 of light flux controlling member 5 is formed such that the light output from light emitting element 4, except for light near optical axis L1, is refracted and incident to hold θ1>θ2. In this way, the relationship between θ1 and θ2 gradually changes between an area near optical axis L1 and an area where θ1 is greater. However, with the present embodiment, taking into account the surface reflectivity of light by lighting-target member 3 (a translucent flat member such as a transparent plastic plate, a glass plate, and so on) and the luminous intensity of light output from light emitting element 4, input surface 15 is formed such that light with which θ1 is maximum 80° is output with a maximum θ3 value being approximately 70°. If the value of θ3 is too large, surface reflection on the surface of illumination-target member 3 is more likely. Here, with the present embodiment, near optical axis L1, θ1 has an angular range of 0°-17°.

Figure 6:
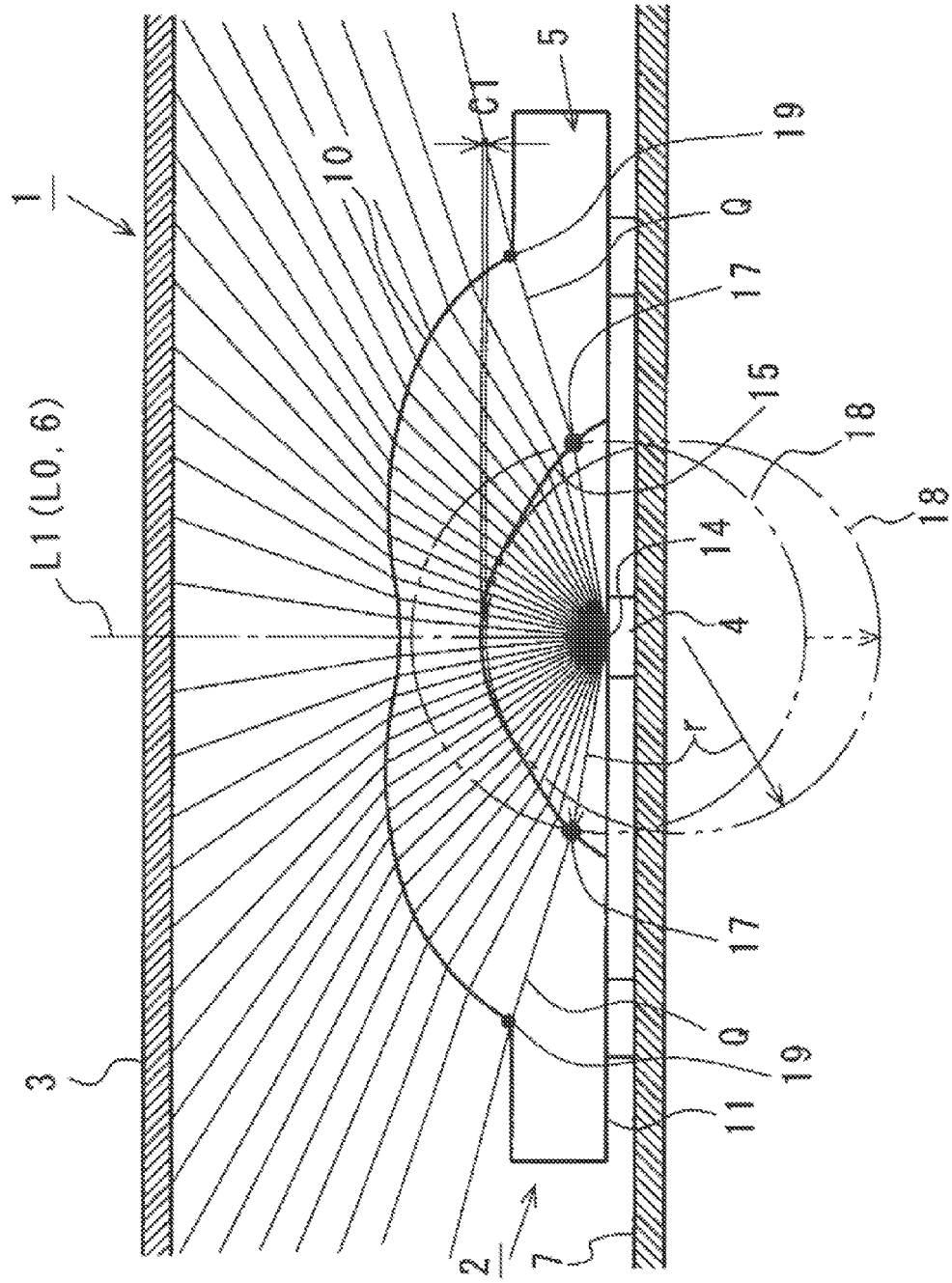
FIG. 6 is a cross sectional view matching FIG. 3, explaining the shape of an input surface of a light flux controlling member according to the first embodiment.

As shown in FIG. 6, the dimension of light (Q) arriving at outermost edge 19 of light control output surface 10, from input point 17 into light flux controlling member 5, to light emission center 14, is r. If virtual circle 18 having a radius of r is moved to a location to inscribe input surface 15, input surface 15 of light flux controlling member 5 is formed in a shape to produce gap C1 between the peak part of virtual circle 18 and the deepest part of input surface 15. Also, when the borer part between input surface 15 and back surface 11 is c-chamfered or r-chamfered, input surface 15 does not include that part. In other words, the area through which light arriving at light control output surface 10 enters light flux controlling member 5, is input surface 15. Also, the angle of the line segment connecting between input point 17 of light (Q) arriving at outermost edge 19 of control output surface 10 into light flux controlling member 5, with respect to optical axis L1, is θ1max.

Light control output surface 10 of light flux controlling member 5 is formed with first output surface 20 that is formed in a predetermined range around optical axis L1 and second output surface 21 that is formed in a continuous fashion around this first output surface 20. As shown in FIG. 4(b), first output surface 20 is formed in a shape of a curved surface that moderately projects downward—that is, in a shape of a recess looking like a ball part of which is cut off. Also, as shown in FIG. 4(b), second output surface 21 is formed in first output surface 20 in a continuous fashion such that its curved surface shape projects upward moderately and its flat surface shape is a hollow disc shape surrounding first output surface 20. Then, these first output surface 20 and second output surface 21 are connected smoothly and the connection point between these output surfaces 20 and 21 is an inflection point. This light control output surface 10 outputs the light from light emitting element 4 entering inside light flux controlling member 5 in a direction to part from optical axis L1. Then, with this light flux controlling member 5, assuming a virtual plane formed by rotating the line segment connecting between input point 17 and an output point on outermost edge 19 around optical axis L1 as an axis of symmetry, beyond this virtual plane toward back surface 11, a dead space where light entering inside light flux controlling member 5 via input surface 15 does not arrive is formed.

The relationship between the shape of the light flux controlling member and the output light characteristic will be described based on FIG. 7 and FIG. 8.

Figure 7:
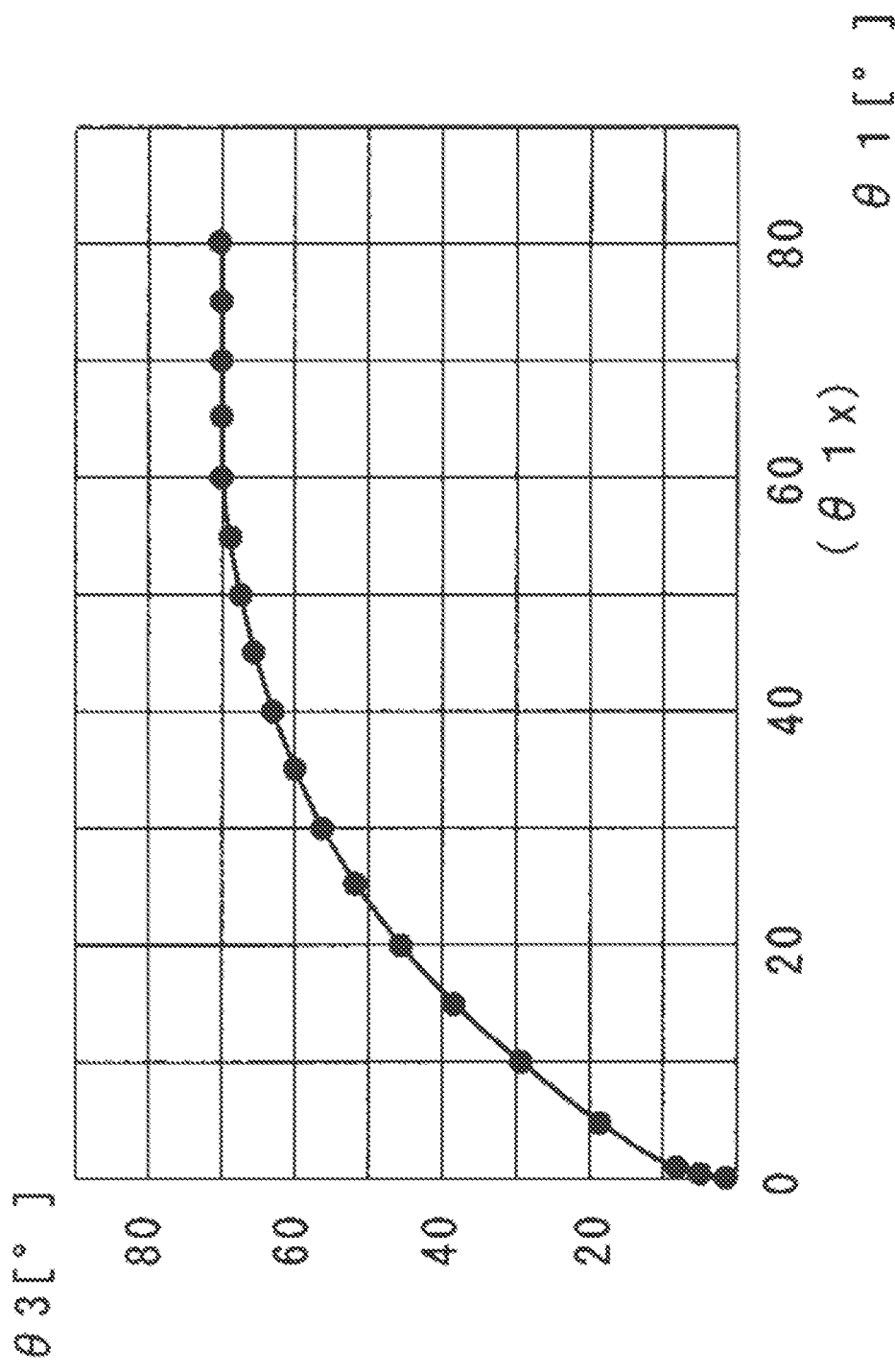
FIG. 7 shows the relationship between incidence angle θ1 and output angle θ3 of a light flux controlling member according to the first embodiment.

FIG. 7 shows the relationship between θ1 and θ3. As shown in this FIG. 7, θ3 is nearly a constant value in a range between 80°, which is the maximum value of θ1, and θ1x (80°−δ), which is a predetermined angle (δ) smaller than 80° (that is, the range of (θ1x≤θ1≤80°)). This means that the light to be output from light control output surface 10 becomes virtually parallel in the range of θ1x≤θ1≤80°. Furthermore, the relationship between θ1 and θ3 is θ1<θ3 in the range where θ1<θ1x.

This is because, in the range of θ1<θ1x, the light output from light control output surface 10 is output to spread wider than incidence angle θ1 of light in light flux controlling member 5.

Also, the relationship between θ1 and θ3 is θ1<θ3 in the range where θ1<θ1x. With light flux controlling member 5 according to the present embodiment, input surface 15 and light control output surface 10 are formed such that θ1x is 60°. Also, with light flux controlling member 5 according to the present embodiment, input surface 15 and light control output surface 10 are formed such that θ3 is nearly a constant value (69°±4°) in an angular range where incidence angle θ1 holds θ1x≤θ1≤80°.

Also, the light that is incident through input surface 15 is output from light control output surface 10 in a manner to satisfy Δη3/Δθ1≥0, so that optical paths from light flux controlling member 5 to illumination-target member 3 do not cross and an annular bright part is not produced.

Figure 8:
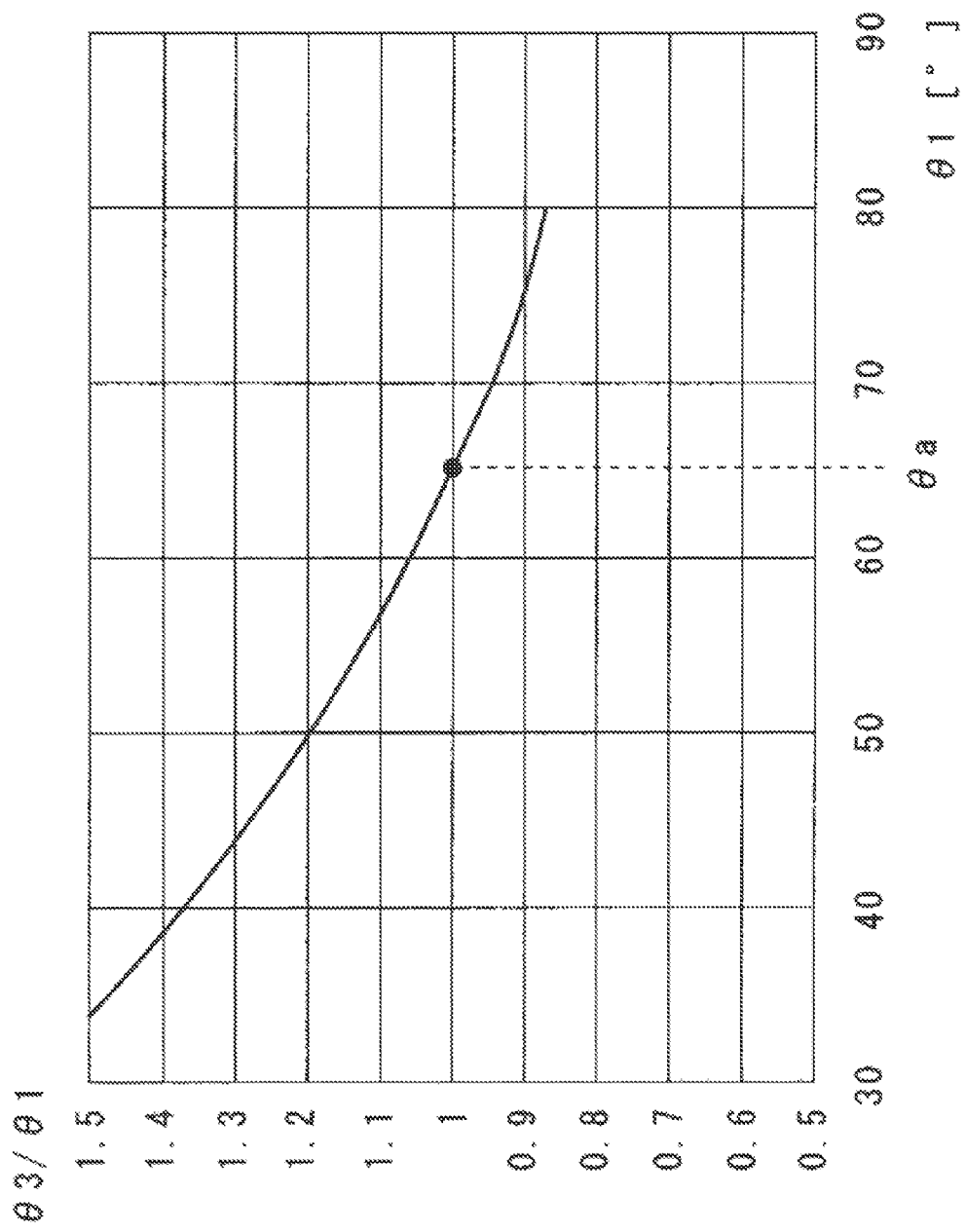
FIG. 8 shows the relationship between the angle ratio (θ3/θ1) of incidence angle θ1 and output angle θ3 in a light flux controlling member and incidence angle θ1, according to the first embodiment.

FIG. 8 shows the relationship between θ1 and (θ3/θ1) with light flux controlling member 5 according to the present embodiment. As shown in this FIG. 8, (θ3/θ1) decreases gradually as θ1 decreases, and is represented by a curved line to project downward moderately. Then, (θ3/θ1) becomes 1 when incidence angle θ1 matches θa in the angular range of θ1x≤θ1≤80°. That is to say, when incidence angle θ1=θa, output angle θ3 and incidence angle θ1 become equal (θ1=θ3), and light is output without being refracted through light control output surface 10. Also, in light flux controlling member 5 according to the present embodiment, input surface 15 and light control output surface 10 are formed to make θa 65°.

Figure 9A:
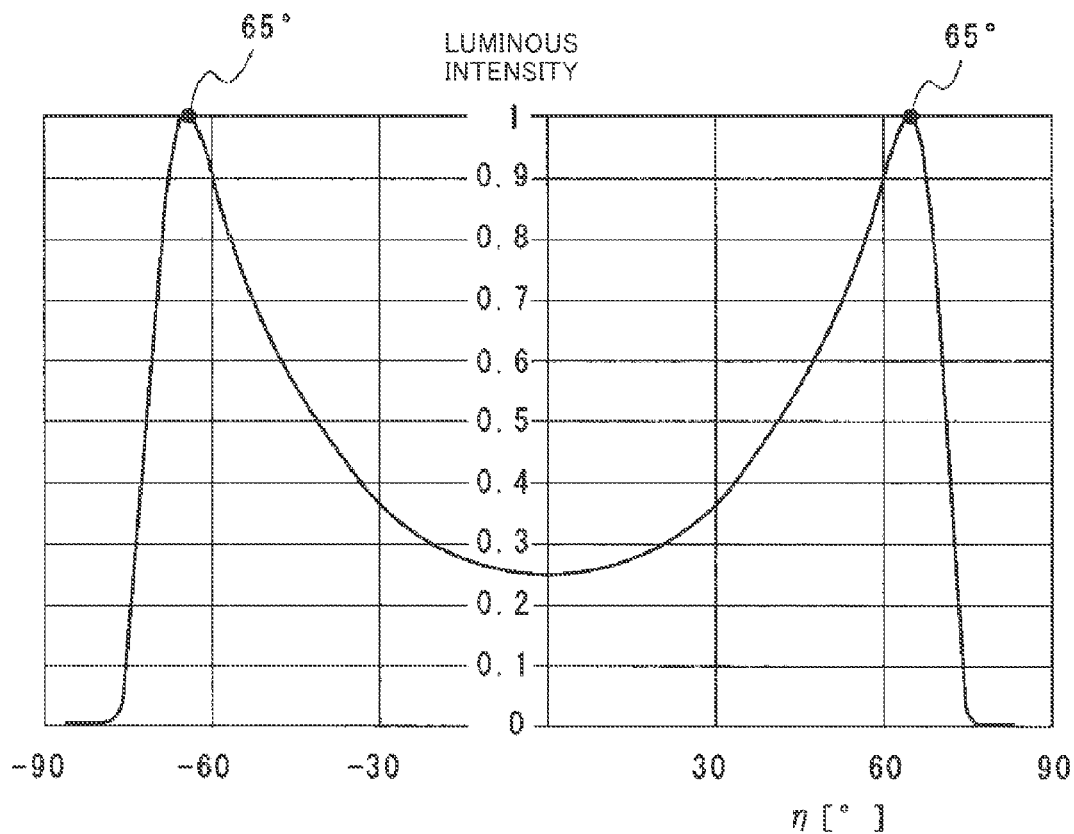
FIG. 9(a) shows the relationship between the luminous intensity of light output from a light flux controlling member according to the first embodiment (given in a dimensionless value, where the value of the maximum luminous intensity is 1), and viewing angle η.
Figure 9B:
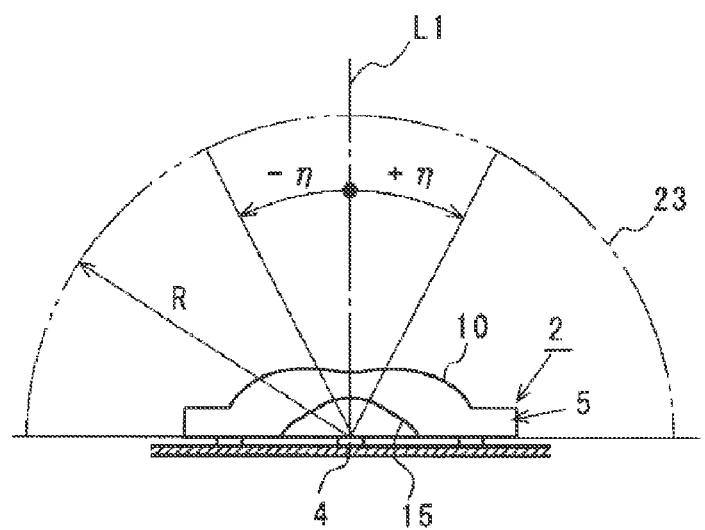
FIG. 9(b) shows a state of luminous intensity measurement with respect to output light from a light flux controlling member according to the first embodiment.

FIG. 9(a) shows the relationship between viewing angle η and luminous intensity in light emitting device 2 according to the present embodiment. Also, as shown in FIG. 9(b), given that semispherical virtual measurement surface 23 is provided in a location a predetermined distance, R, apart from light emitting element 4, viewing angle η is the angle to look at the light emission center of light emitting element 4 from a point on virtual measurement surface 23, and is the angle formed between the line-of-sight direction and optical axis L1.

As shown in FIG. 9(a), using light emitting device 2 of the present embodiment, the luminous intensity of illuminating light output from light flux controlling member 5 is measured in a viewing point on virtual measurement surface 23, and, based on this result, the luminous intensity in the range where viewing angle η varies from 0° to ±65° is represented by a curved line of a downward projection, and the luminous intensity is the highest when viewing angle η is +65° and −65°. Also, with the present embodiment, the luminous intensity at a viewing point located on optical axis L1 on virtual measurement surface 23 where viewing angle η is 0°, is the lowest in the range from 0° to ±65°. Here, given that the luminous intensity when viewing angle η is 65° is 1, the luminous intensity in FIG. 9(a) assumes a dimensionless value, based on comparison between the luminous intensity when viewing angle η is not 65° and the luminous intensity when viewing angle η is 65°.

Comparison with Comparative Examples 1 and 2

Here, light flux controlling member 5 according to the present embodiment shown in FIG. 3 and FIG. 10(a) will be described by comparing light flux controlling member 5 of comparative example 1 shown in FIG. 10(b) and light flux controlling member 5 of comparative example 2 shown in FIG. 10(c). Also, light flux controlling members 5 in FIGS. 10(a) to 10(c) have the same shape, except for input surface 15.

Figure 10A:
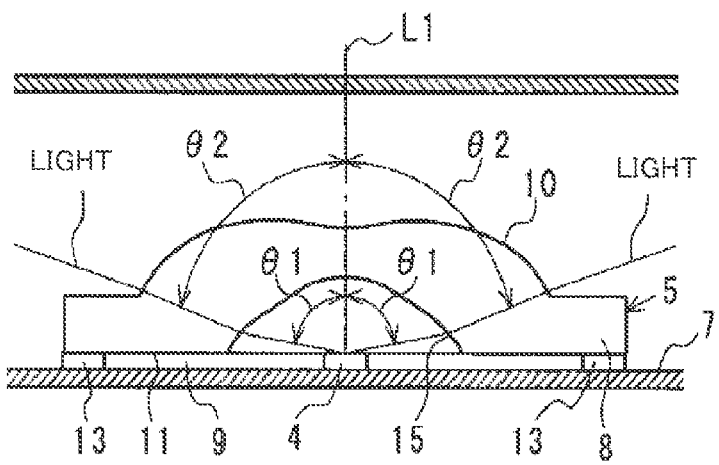
FIG. 10 illustrates comparison of a light flux controlling member according to the first embodiment (FIG. 10(a)), a light flux controlling member according to comparative example 1 (FIG. 10(b)), and a light flux controlling member according to comparative example 2 (FIG. 10(c))

As shown in FIG. 3 and FIG. 10(a), with light flux controlling member 5 according to the present embodiment, the light from light emitting element 4, except for light near optical axis L1, is refracted and incident toward optical axis L1 to hold θ1>θ2 (that is, to reverse θ1<θ2 to θ1>θ2, in the range of 0<θ1≤θ1max, following the increase of θ1), so that it is possible to guide incident light of a wide angle (for example, θ1=80°) even if flange 8 is formed, and use the light from light emitting element 4 efficiently as illuminating light.

Figure 10B:
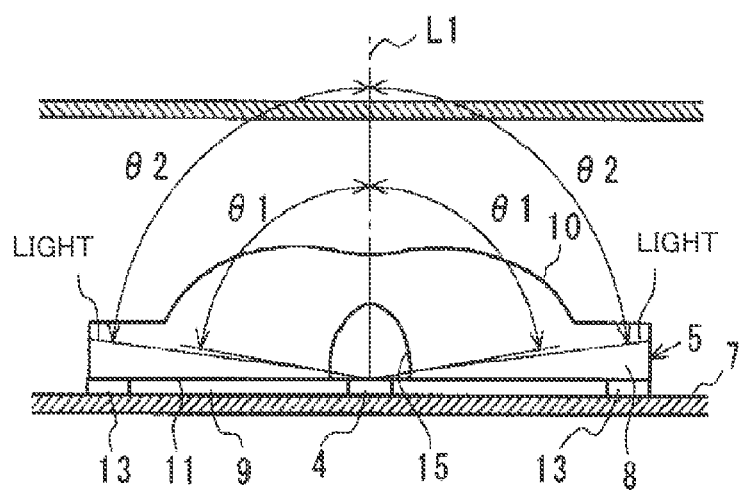

By contrast with this, as shown in FIG. 10(b), with light flux controlling member 5 according to comparative example 1 adopting the input surface shape of prior art 1, light of a wide angle (for example, θ1=80°) from light emitting element 4 is refracted by input surface 15 such that θ1<θ2 (that is, refracted in a direction to part farther from optical axis L1). As a result of this, with light flux controlling member 5 shown in FIG. 10(b), light of a wide angle (for example, θ1=80°) from light emitting element 4 is refracted by input surface 15 and furthermore later guided by flange 8, and therefore the light from light emitting element 4 cannot be used efficiently as illuminating light.

Figure 10C:
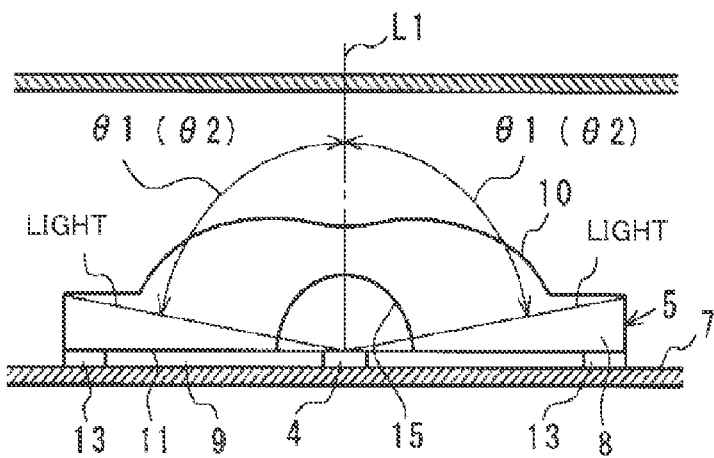

Also, as shown in FIG. 10(c), light flux controlling member 5 according to comparative example 2 adopting the input surface shape of prior art 2, light of a wide angle (for example, θ1=80°) from light emitting element 4 is incident as is, without being refracted by input surface 15, and furthermore later guided by flange 8, and therefore the light from light emitting element 4 cannot be used efficiently as illuminating light.

Advantage of the Present Embodiment

As described above, with light flux controlling member 5 of the present embodiment, even if flange 8 is formed, it is still possible to use light of a wide angle (for example, θ1=80° from light emitting element 4 efficiently as illuminating light, so that it is possible to illuminate illumination-target member 3 such as an advertisement panel bright.

Also, with light flux controlling member 5 of the present embodiment, in the light to use as illuminating light, light in a close range to maximum incidence angle θ1 (60°≤θ1≤80°) is output from light output control surface 10 in parallel light fluxes, and light near maximum incidence angle θ1 can be output without widening too much (θ1max≥θ3max), so that it is possible to reduce the light to be reflected by illumination-target member 3 (that is, light that is not directly used as illuminating light) and improve the efficiency of use of light.

Also, light flux controlling member 5 of the present embodiment outputs incident light to hold Δθ3/Δθ1≥0, so that an annular bright part is not formed on an illumination-target surface of illumination-target member 3.

Also, with light flux controlling member 5 of the present embodiment, flange 8 can be formed on the inner side along the diameter direction of light control output surface 10, so that, upon manufacturing or at the time of assembly with light emitting element 4 and others, it is possible to easily handle flange 8 that projects outward in the diameter direction of light control output surface 10, using an automated device, thereby preventing light control output surface 10 from being damaged by an automated device.

Thus, light emitting device 2 using light flux controlling member 5 according to the present embodiment and lighting device 1 having this light emitting device 2, allow efficient use of illuminating light from light emitting element 4 to illuminate illumination-target member 3 such as an advertisement panel, so that it is possible to illuminate illumination-target member 3 such as an advertisement panel bright and improve the quality of lighting.

(Second Embodiment of Light Flux Controlling Member)

Figure 11:
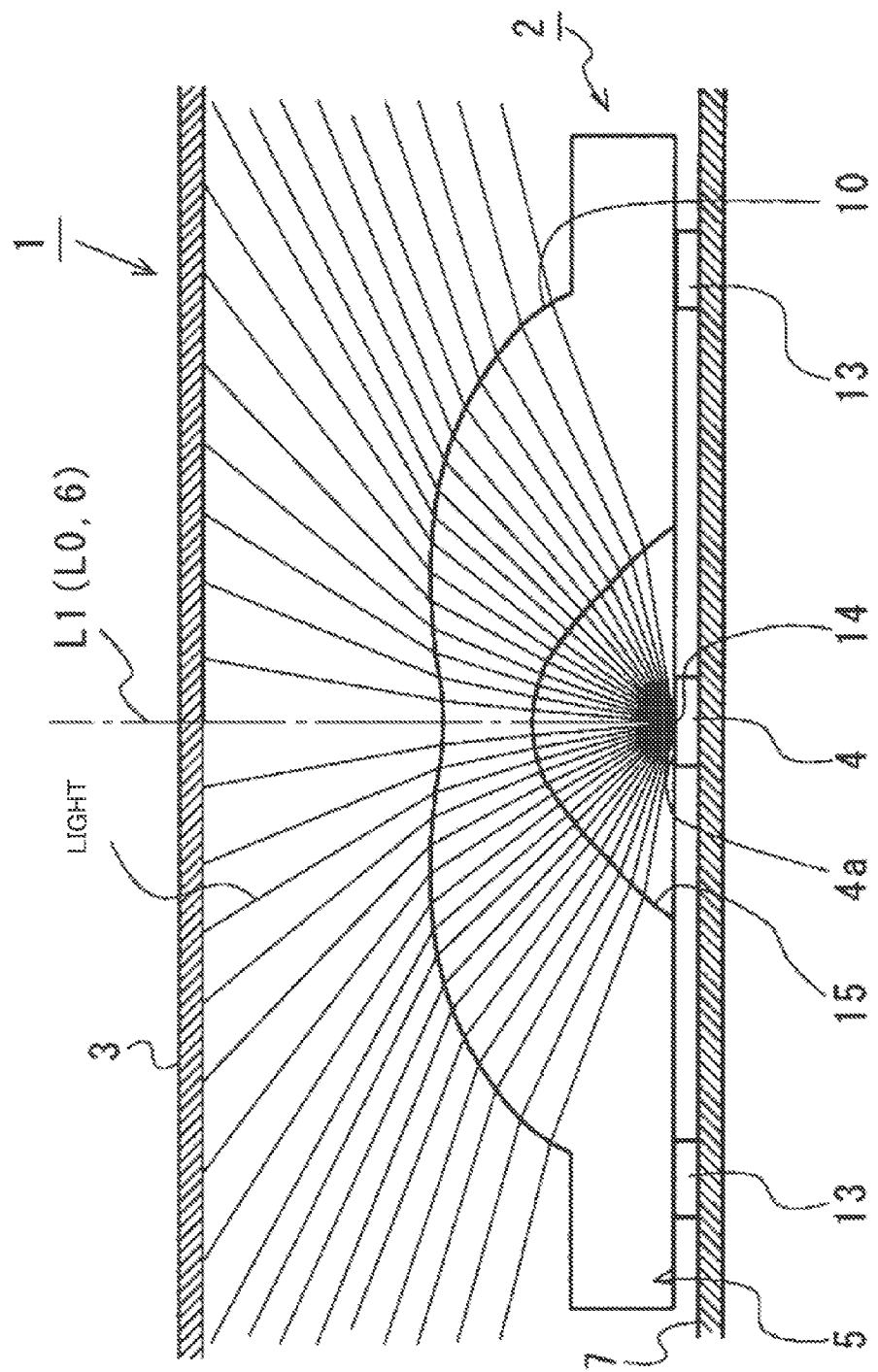
FIG. 11 is a cross sectional view of a light emitting device using a light flux controlling member according to a second embodiment, and a lighting device having this light emitting device.

FIG. 11 and FIG. 12 show a second embodiment of light flux controlling member 5. Also, FIG. 11 is a cross sectional view of light flux controlling member 5 according to a second embodiment and lighting device 1 having this light emitting device 2. Also, FIG. 12(a) is a plan view of light flux controlling member 5, FIG. 12(b) is a cross sectional view of light flux controlling member 5 cut along line A2-A2 in FIG. 12(a), FIG. 12(c) is a rear view of light flux controlling member 5, and FIG. 12(d) is a side view of light flux controlling member 5. Also, the components and elements of light flux controlling member 5 according to the present embodiment are the same as those of the first embodiment light flux controlling member 5 shown in FIG. 3 and FIG. 4, except for the shape of input surface 15, and therefore will be assigned the same reference codes and numerals, and descriptions that overlap with the first embodiment of light flux controlling member 5 will be omitted.

With light flux controlling member 5 of the present embodiment, the ratio of diameter D of opening edge of recess 12 constituting input surface 15, and maximum depth H of recess 12 (D/H) is 2.7, whereas (D/H) with light flux controlling member 5 according to the first embodiment is 3.4, and therefore the opening edge of recess 12 is formed smaller than the opening edge of recess 12 of light flux controlling member 5 of the first embodiment.

Also, input surface 15 of light flux controlling member 5 of the present embodiment refracts and receives as input light such that light, except for light near optical axis L1 (for example, an angular range where θ1 varies from 0° to 40°, approaches optical axis L1 closer.

Figure 13:
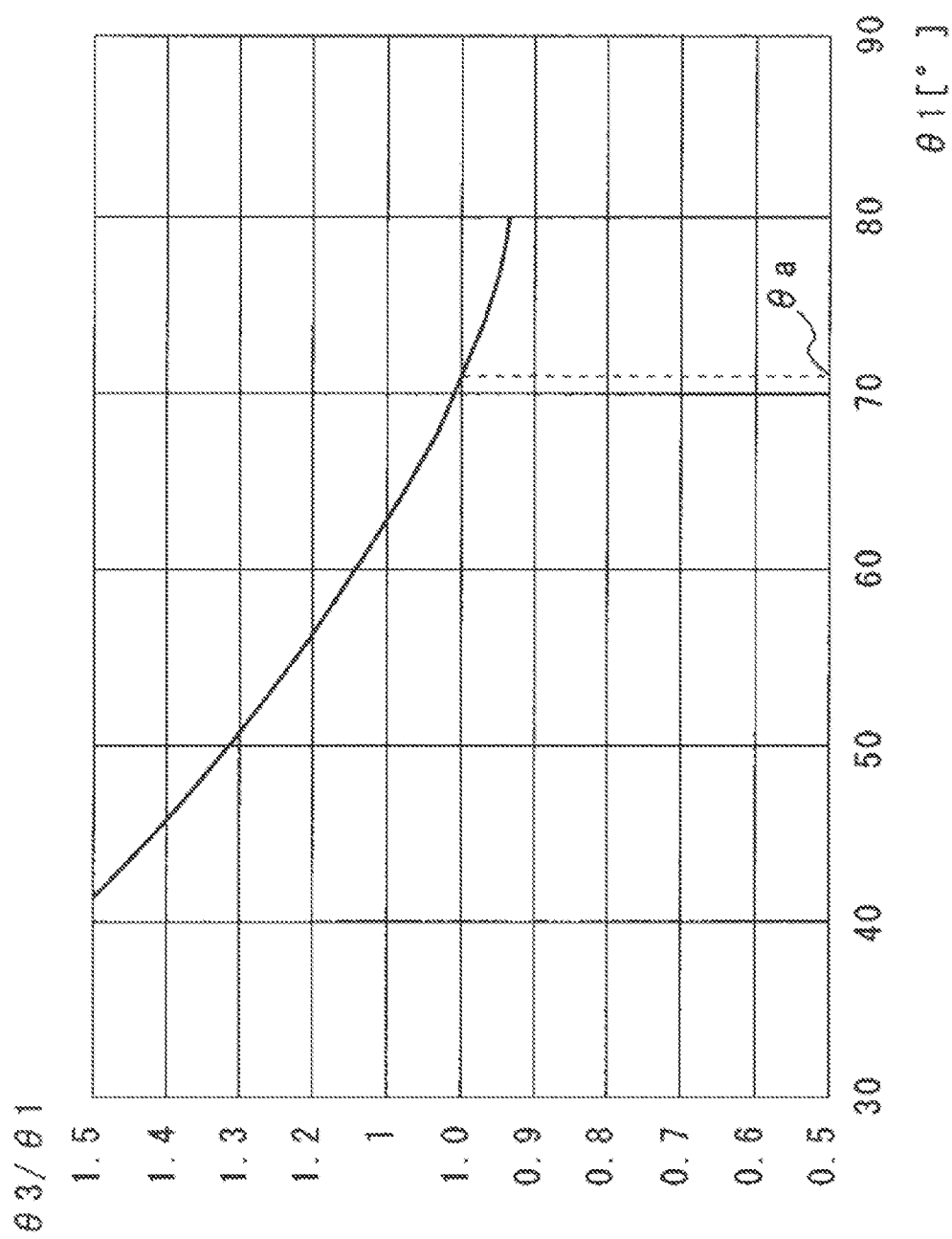
FIG. 13 shows the relationship between the angle ratio (θ3/θ1) of incidence angle θ1 and output angle θ3 in a light flux controlling member according to the second embodiment, and incidence angle θ1.

Also, as shown in FIG. 13, with light flux controlling member 5 of the present embodiment, input surface 15 and light control output surface 10 are formed such that (θ3/θ1) is 1 when θ1 is 71°. Also, with light flux controlling member 5 of the present embodiment, in the light to use as illuminating light, light in a close range to maximum incidence angle θ1 (60°≤θ1≤80°) is output from light output control surface 10 in parallel light fluxes (that is, in light fluxes in an angular range of 71.5°±3.5°), without widening light near maximum incidence angle θ1 too much.

If the line in FIG. 8 representing the relationship between (θ3/θ1) and θ1 is moved along the horizontal axis, this line virtually matches the line in FIG. 13 representing the relationship between (θ3/θ1) and θ1.

Figure 14:
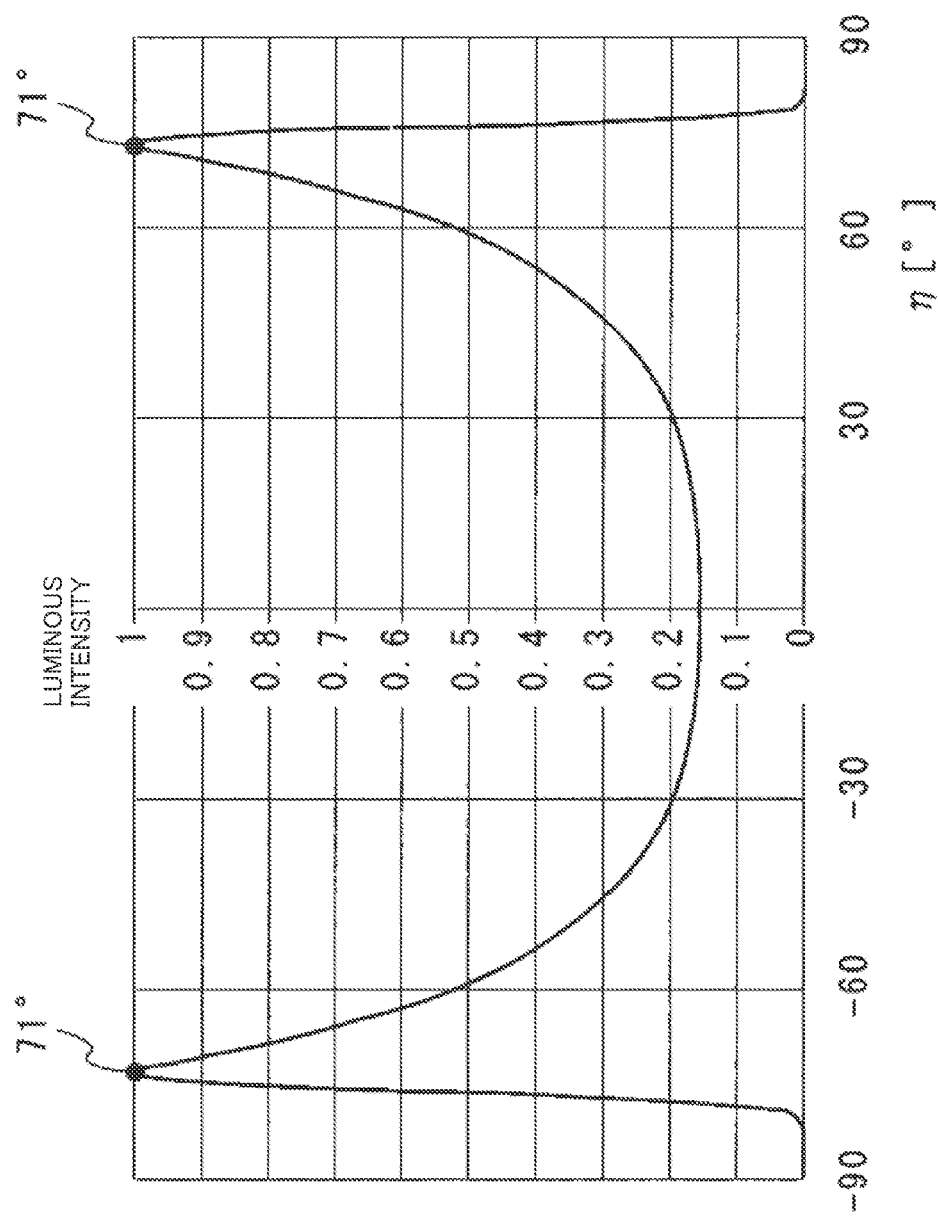
FIG. 14 shows the relationship between the luminous intensity of light output from a light flux controlling member according to the second embodiment (given in a dimensionless value, where the value of the maximum luminous intensity is 1), and viewing angle η.

Also, as shown in FIG. 14, with light flux controlling member 5 of the present embodiment, input surface 15 and light control output surface 10 are formed to have the maximum luminous intensity when viewing angle η is 71°.

This light flux controlling member 5 of the present embodiment provides the same advantage as light flux controlling member 5 according to the first embodiment.

Also, with light emitting device 2 using light flux controlling member 5 of the present embodiment, and lighting device 1 having this light emitting device 2, provide the same advantage as the light emitting device and lighting device 2 according to the first embodiment.

(Other Variations)

Figure 15A:
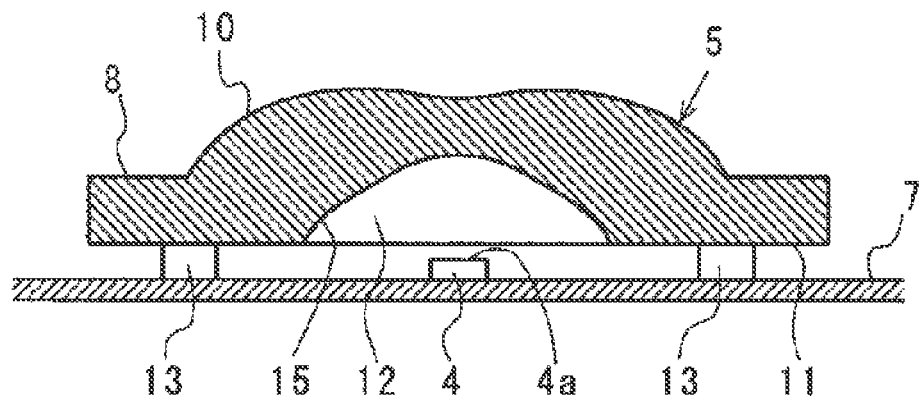
FIG. 15(a) shows variation 1 of a state in which a light flux controlling member is provided.
Figure 15B:
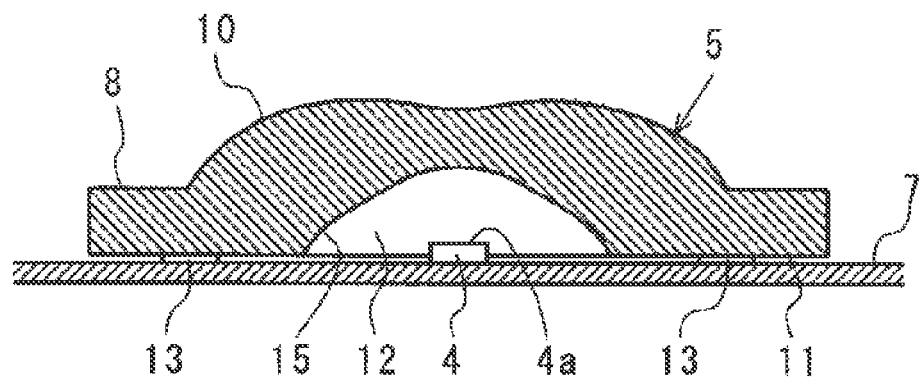
FIG. 15(b) shows variation 2 of a state in which a light flux controlling member is provided.

Cases have been described with the above embodiments where light emitting surface 4a of light emitting element 4 and back surface 11 of light flux controlling member 5 are assembled to be at the same height with respect to substrate 1. However, the present invention is by no means limited to the above embodiments, and, as shown in FIG. 15(a), it is equally possible to place back surface 11 of light flux controlling member 5 in a higher location than light emitting surface 4a of light emitting element 4. As shown in FIG. 15(b), it is also possible to place light emitting surface 4a in recess 13 of light flux controlling member 5.

Also, with the present invention, the maximum value of incidence angle θ1 of light to use as illuminating light may be set 80° or greater, based on the location of the light emitting surface of light emitting element 4 and the thickness of flange 8, or, it is equally possible to set the maximum value of incidence angle θ1 of light to use as illuminating light may be set 80° or less.

Also, although cases have been described with the above embodiments by way of example where the value (θa) of θ1 at which (θ3/θ1)=1 is 65° and 71°, the present invention is by no means limited to these, and it is equally possible to form the shape of input surface 15 and the shape of light control output surface 10 such that as a result of this θa has other angles than 65° and 71°, and achieve the same advantage as the advantage of the first embodiment of light flux controlling member 5.

The light emitting device according to the present invention is applicable to an internal-lighting lighting device that illuminates an illumination-target member such as an advertisement panel and a liquid crystal display panel from the rear, is applicable to an external-lighting lighting device that illuminates a ceiling surface, a floor surface or a wall surface, and furthermore is also applicable as a guidance light.

The invention claimed is:

1. A light emitting device comprising:
a light emitting element implemented on a substrate;
a light flux controlling member that is placed such that a reference optical axis, which is a traveling direction of light in a center of a three dimensional output light flux, and an optical axis, which is a traveling direction of light in a center of a three dimensional output light flux of the light emitting element, are located on a same axis, and that controls the traveling direction of the light flux output from the light emitting element, the light flux controlling member comprising:
an input surface that is formed in a non-spherical surface of rotational symmetry with respect to the optical axis, by forming a recess in a surface opposing the light emitting element, and receives as input the light from the light emitting element; and
a light control output surface that is formed on an opposite side from a back surface and outputs the light received as input in the input surface, wherein:
when an angle formed between an optical path and the optical axis is θ2, the optical path being a path on which light that is output from a light emission center of the light emitting element at angle θ1 with respect to the optical axis and is incident on the input surface travels inside the light flux controlling member, and angle θ1 of light to arrive at an outermost edge of the light control output surface in the light output from the light emitting element is θ1max;
the input surface and the light control output surface are formed such that, in a range where 0<θ1≤θ1max, a relationship in size between θ1 and θ2 gradually changes from θ1<θ2 to θ1>θ2, following an increase of θ1; and
the input surface is formed in a shape such that a deepest part of the input surface is included within a virtual circle when the virtual circle having a radius of r is formed at the light emission center of the light emitting element as a center, and a gap between a peak part of the virtual circle and the deepest part of the input surface is produced when the virtual circle is moved to a location to inscribe the input surface, where the radius of r is a dimension of light arriving at the outermost edge of the light control output surface, from the input point into the light flux controlling member, to the light emission center of the light emitting element.

2. The light flux controlling member according to claim 1, wherein, when an angle formed between an optical path on which the light that is output from the light emission center of the light emitting element at angle θ1 with respect to the optical axis and that is output from the light control output surface travels, and the optical axis, is θ3, the input surface and the light control output surface are formed such that, in the range where $0<\theta 1\leq\theta 1max$, a relationship in size between $\theta 1$ and $\theta 3$ gradually changes from $\theta 1<\theta 3$ to $\theta 1>\theta 3$, following an increase of $\theta 1$.

3. The light flux controlling member according to claim 2, wherein the input surface and the light control output surface are formed to satisfy $\Delta\theta 3/\Delta\theta 1\geq 0$, wherein $\Delta\theta 3$ is a difference between $\theta 3$ of a first optical path and $\theta 3$ of a second optical path, different from the first optical path, and $\Delta\theta 1$ is a difference between $\theta 1$ of the first optical path and $\theta 1$ of the second optical path.

4. A lighting device comprising a light emitting device according to claim 1 and an illumination-target member that is illuminated by light output from the light emitting device.

* * * * *